April 26, 1966  I. MAZZE  3,247,772
CAMERA LENS HOLDER
Filed May 11, 1964  3 Sheets-Sheet 1
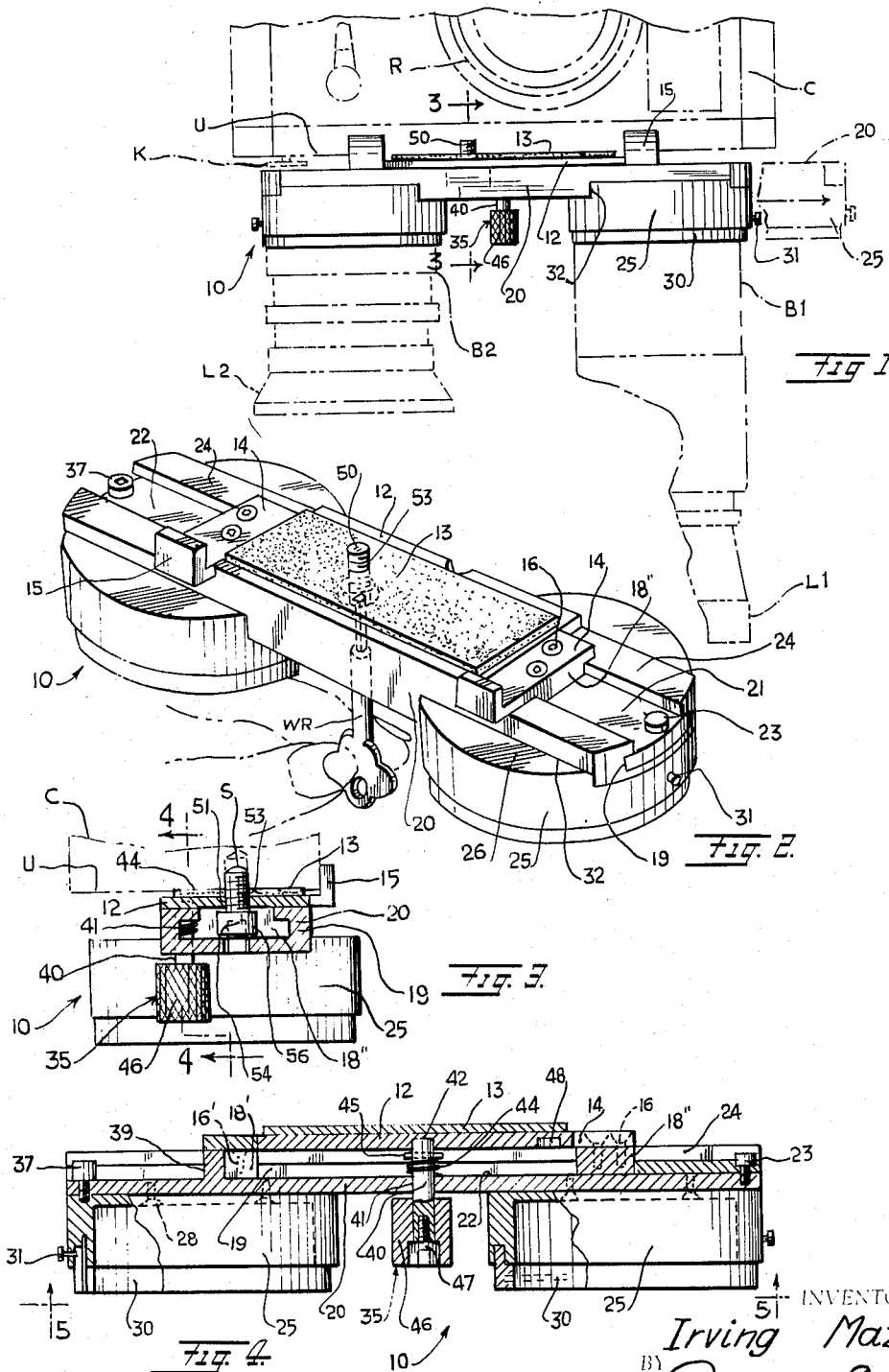
INVENTOR.
Irving Mazze
BY Polachek & Saulsbury
ATTORNEYS.

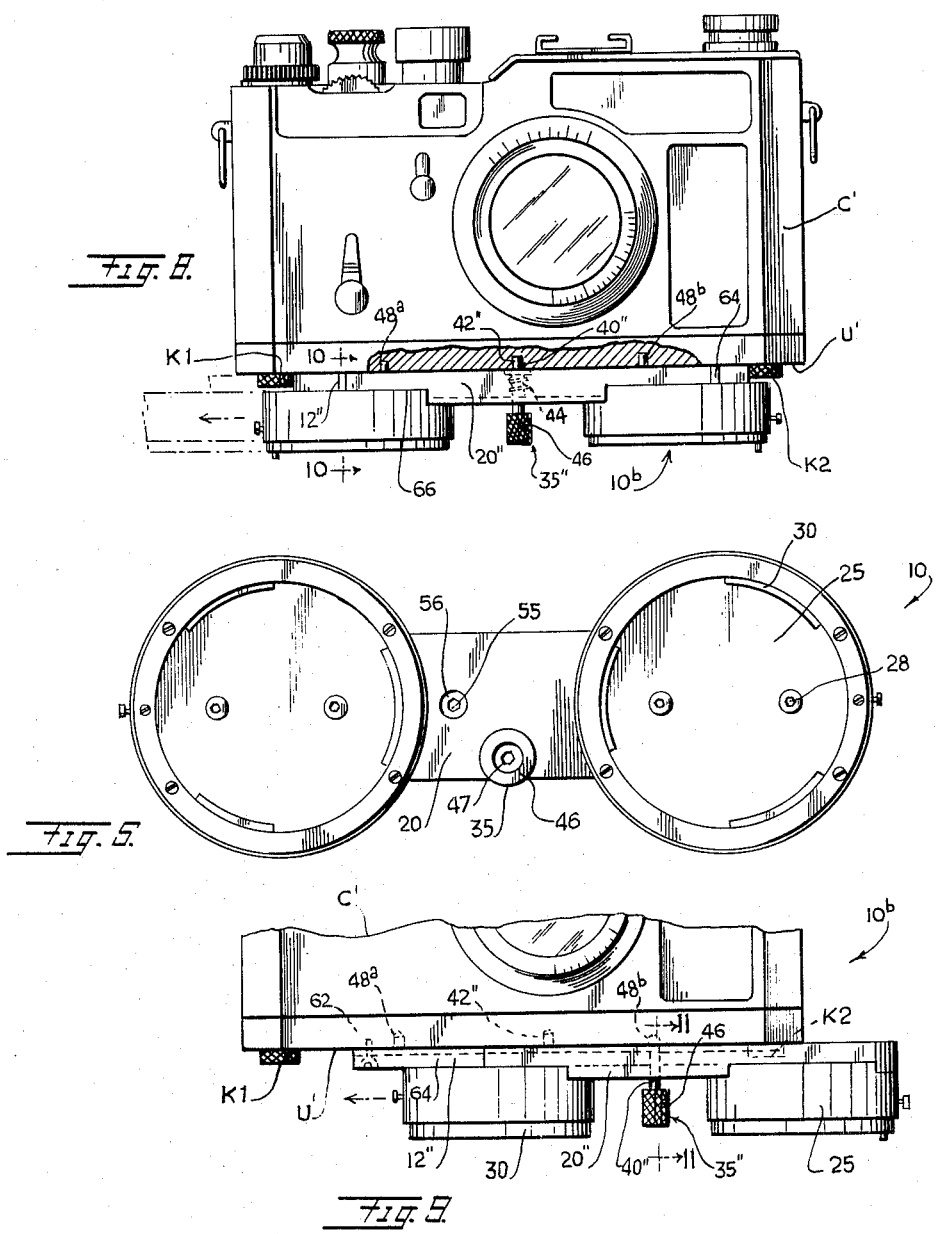

April 26, 1966     I. MAZZE     3,247,772
CAMERA LENS HOLDER
Filed May 11, 1964     3 Sheets-Sheet 3
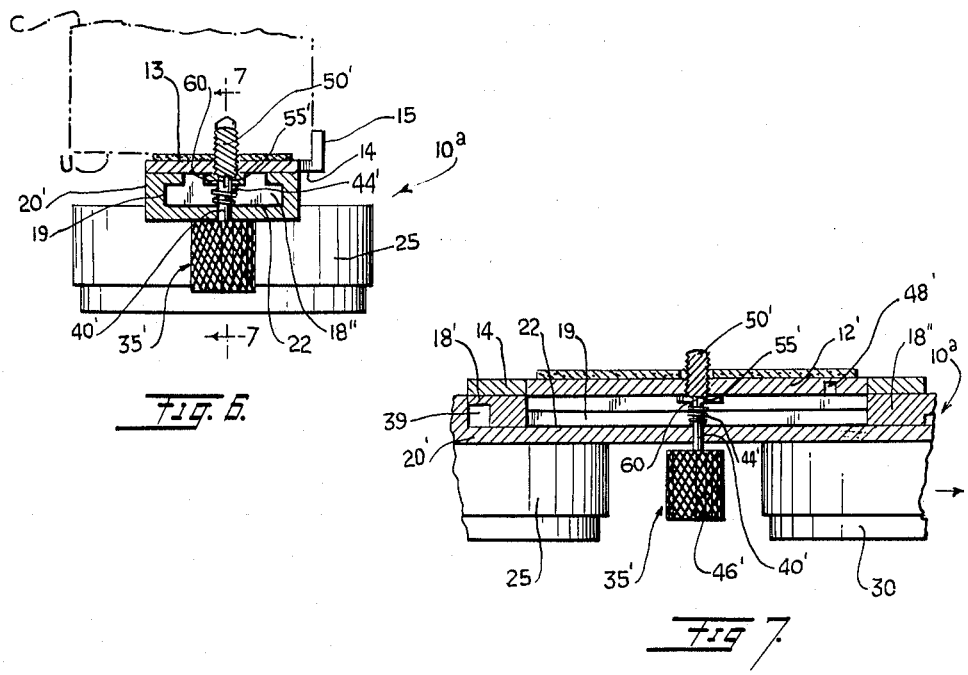
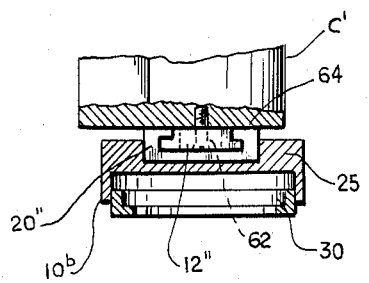
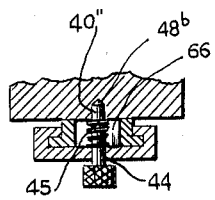
INVENTOR.
*Irving Mazze*
BY *Polachek & Saulsbury*
*ATTORNEYS.*

United States Patent Office 3,247,772
Patented Apr. 26, 1966

3,247,772
CAMERA LENS HOLDER
Irving Mazze, 365 W. 36th St., New York, N.Y.
Filed May 11, 1964, Ser. No. 366,418
10 Claims. (Cl. 95—1)

This invention concerns a lens holder for a camera.

The invention includes a plate which can be mounted at the underside of a miniature camera. The plate has a protruding screw which can be screwed into a threaded tripod socket of the camera. The plate has a slidable carriage provided with cups having bayonet-type joints for detachably securing a pair of lenses therein. Either lens can be instantly removed from the carriage and mounted on the lens barrel mounting of the camera. Thus a photographer has instantly available a choice of lenses and can use them interchangeably for taking pictures which could not be taken without the lenses. The sliding carriage makes it possible to rotate a film drive key under the camera without having to remove the mounting plate or remove the lenses. The shifting carriage clears the key for turning. The carriage can be shifted to either of two positions where it is held in place by a spring-biased locking pin.

In a modification of the invention the mounting plate is provided as a permanent part of the camera and the carriage moves laterally on this plate.

In a further modification of the invention, the spring-biased locking pin which holds the carriage in its two positions, serves as a wrench to turn the mounting screw, and the mounting screw serves as a carriage locating member.

It is therefore a principal object of the invention to provide a device for removably mounting lenses at the underside of a camera, said device including a mounting plate and a slidable carriage movable laterally on the plate.

Another object is to provide a device as described wherein the slidable carriage has two spaced positions in which it can be held by a spring-biased locking pin.

A further object is to provide a device as described, wherein the mounting plate is secured at the underside of the camera by a screw engaged in the tripod socket.

Another object is to provide a device as described, wherein the spring-biased locking pin serves as a wrench for turning the plate mounting screw.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an elevational view of the device, with lenses and camera shown in dotted lines.

FIG. 2 is a perspective view of the device.

FIG. 3 is a cross-sectional view taken on line 3—3 of FIG. 1.

FIG. 4 is a longitudinal sectional view partially in side elevation, taken on line 4—4 of FIG. 3.

FIG. 5 is a bottom plan view of the device.

FIG. 6 is a sectional view similar to FIG. 3, illustrating a modification of the invention.

FIG. 7 is a fragmentary sectional view similar to a part of FIG. 4, taken on line 7—7 of FIG. 6.

FIG. 8 is a front elevational view of a camera with another device embodying the invention, the carriage of the device being shown in one position thereon.

FIG. 9 is a fragmentary elevational view similar to part of FIG. 8, showing the carriage in another position.

FIG. 10 is a fragmentary sectional view taken on line 10—10 of FIG. 8.

FIG. 11 is a fragmentary sectional view taken on line 11—11 of FIG. 9.

Referring first to FIGS. 1–5, there is shown a device 10 embodying the invention. The device includes a mounting plate 12 on the upper side of which is cemented a resilient pad 13. The opposite ends of plate 12 are secured to crossbars 14. Each bar has an upstanding finger 15 near the front side of the device for abutment with the front wall W of camera C. Bars 14' and 14" are secured by screws 16 to T-shaped plates 18', 18" so that plates 12, 18', 18" and bars 14 form a rigid unitary plate structure. Opposite ends of plates 18', 18" engage in lateral grooves 19 of a slidable carriage bar 20. A stop plate 21 is secured by screw 23 at the right end of the channel 22 in bar 20. The undersides of bars 14 face and extend over the top faces of flanges 24. The flanges 24 of bar 20 are thus slidably engaged between the bars 14 and plates 18', 18".

A pair of inverted lens holder cups 25 have their circular sides 26 secured by screws 28 to the underside of bar 20. These cups are open at the bottom of the device. The cups are provided with flanges 30 forming bayonet types of joints at their bottom open ends for detachably securing the barrels B1 and B2 of two lenses L1 and L2 of different axial lengths. Longer lens L1 may be a telephoto lens while shorter lens L2 may have a short focal length for close-up photographic work. Spring-biased pins 31 hold the lenses nonrotatably in the cups.

The cups 25 are provided with diametral grooves 32 in which the bottom of bar 20 is received so that the cups are nonrotatably supported thereby. The cups and bar 20 can be moved between either of two positions. In one position, shown in FIGS. 1–5, by solid lines, the cups and bar are centrally aligned with respect to the ends of the mounting plate 12. A locking pin 35 serves to hold the bar 20 and plate 12 in relatively fixed position. A screw 37 at the left end of channel 22 serves as a stop member by engaging recess 39 in the left bar 18'. Pin 35 has a stud 40 extending through a hole 41 in bar 20. This stud fits into a centrally located recess 42 in the underside of plate 12. The stud is held in this recess by a coil spring 44 on the stud. The upper end of the spring bears on a cross pin 45 in the stud and the lower end of the spring bears on the upper side of the channel bottom 22 of the bar 20. The pin 35 has a knurled head 46 mounted on the bottom end of stud 40 by a screw 47. Thus the pin can be pulled downwardly to clear recess 42. When the pin is thus retracted the bar 20 can be moved laterally with cups 25 to the dotted line position of FIG. 1.

A recess 48 is located laterally of recess 42 in the underside of plate 12 and in alignment with recess 42 on a longitudinal line of the plate offset from the center of the plate. Thus the stud 40 can be engaged in recess 48 when the head 46 of the retracted pin 35 is released, with the bar 20 in the extreme right position on plate 12. When the bar 20 and cups 25 are thus laterally positioned, the left end of the camera C as viewed in FIG. 1 will be cleared and the key K at the underside of the camera will be exposed so that it can be conveniently wound for advancing film in the camera.

In order to mount the device in threaded socket S at the underside U of the camera, there is provided a screw 50 whose shank extends upwardly through centrally located registering holes 51, 53 in plate 12 and pad 13. The head 54 of the screw has a recess 55 exposed through a hole 56 in the channel bottom 22 when the bar is centrally positioned with respect to plate 12. In this position the stop plate 21 carried by bar 12 is in abutment with the right end of plate 12 as shown in FIGS. 1 and 2. A key-type wrench WR can be inserted through hole 56 into recess 55 when the carriage is centered as indicated in FIG. 2, for turning screw 50 to tighten or loosen the same. When the bar 20 and cups 25 which constitute the carriage for the lenses, are offset to the right with respect to plate 12, then the head of screw 37 engages in the recess 39 in bar 14', while stud 40 engages in recess 48.

Either lens L1 or L2 can be quickly removed from a cup 25 and engaged on lens mounting ring R of the camera. When not in use the lenses are suspended axially downward from the camera as indicated by dotted lines in FIG. 1.

FIGS. 6 and 7 show portions of another device 10a which is similar to device 10 and corresponding parts are identically numbered. The device has a mounting screw 50' centrally located like screw 50 in device 10. In order to turn this screw there is provided a noncircular recess 55' which receives a noncircular tip 60 at the end of stud 40' of pin 35'. Pin 35 of device 10 is replaced by carriage locking pin 35' which has stud 40' normally biased upwardly from bar 20' by spring 44'. The head 46' of the pin can be retracted against tension in spring 44' to clear the tip 60 of stud 40' from recess 55'. Recess 55' thus serves in place of recess 42 to lock the carriage bar 20' and cups 25 in the centered position on the plate 12'. Recess 48' in plate 12' is aligned with the axis of screw 50' on the central, longitudinal line of the plate for receiving the tip 60 of stud 40' in the laterally shifted or right position of the carriage on plate 12'. The device 10a thus uses the single mounting screw as a positioning recess and the locking pin 35' also serves as a thumb wrench for turning screw 50' to tighten or loosen it at the underside U of camera C.

In FIGS. 8–11 is shown another lens holding device 10b which is similar to device 10, and corresponding parts are identically numbered. In this device a mounting plate 12" is secured to the underside U' of camera C' by end screws 62. The plate has flanges 64 at its edges spaced from the underside of the camera to provide grooves S in which flanges 24" of carriage bar 20" can engage. The mounting screw 50 of device 10 is omitted. Locking pin 35" is arranged like pin 35 with stud 40" engaging selectively in either central recess 42" or lateral recesses 48a, 48b at the underside of the camera. Plate 12" has a central slot 66 along which the stud 40" can be moved when retracted from recesses 42" and 48a, 48b when the carriage is moved laterally from one end position to another. The stop plate 21 and stop screw 37 of device 10 are omitted. The carriage can be moved to the right or left to provide access to operating knobs or keys K1, K2 at opposite lateral edges of the underside of the camera. The plate 12" is intended for permanent mounting and need not be removed.

In all forms of the invention there is provided a carriage including holding cups for lenses and a channel-shaped carriage bar which slides on a mounting plate at the underside of a camera.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and holding a pair of lens assemblies, said plate structure having recesses therein spaced apart longitudinally of the plate structure, and a locking pin carried by said bar, said pin having a stud spring-biased inwardly toward said plate structure for engaging in said recesses respectively, said pin having a head disposed outside of said bar for retracting the stud from the recesses as the carriage bar is moved longitudinally along said plate structure to clear an operating member at the underside of the camera.

2. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and holding a pair of lens assemblies, said plate structure having recesses therein spaced apart longitudinally of the plate structure, a locking pin carried by said bar, said pin having a stud spring-biased inwardly toward said plate structure for engaging in said recesses respectively, said pin having a head disposed outside of said bar for retracting the stud from the recesses as the carriage bar is moved longitudinally along said plate structure to clear an operating member at the underside of the camera, and a mounting screw centrally located in said plate structure for engaging in a threaded hole in the underside of the camera, said carriage bar having an opening to permit passage of a turning tool therethrough to engage said mounting screw.

3. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and holding a pair of lens assemblies, said plate structure having recesses therein spaced apart longitudinally of the plate structure, and a locking pin carried by said bar, said pin having a stud spring-biased inwardly toward said plate structure for engaging in said recesses respectively, said pin having a head disposed outside of said bar for retracting the stud from the recesses as the carriage bar is moved longitudinally along said plate structure to clear an operating member at the underside of the camera, said bar having stop members at opposite ends for engaging opposite ends of the plate structure to limit longitudinal movement of said bar at both ends of the plate structure.

4. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and holding a pair of lens assemblies, said plate structure having recesses therein spaced apart longitudinally of the plate structure, a locking pin carried by said bar, said pin having a stud spring-biased inwardly toward said plate structure for engaging in said recesses respectvely, said pin having a head disposed outside of said bar for retracting the stud from the recesses as the carriage bar is moved longitudinally along said plate structure to clear an operating member at the underside of the camera, and a mounting screw centrally located in said plate structure for engaging in a threaded hole in the underside of the camera, said carriage bar having an opening to permit passage of a turning tool therethrough to engage said mounting screw, said bar having stop members at opposite ends for engaging opposite ends of the plate structure to limit longitudinal movement of said bar at both ends of the plate structure.

5. In combination, a camera having a plate structure on the underside thereof, a carriage bar slidably mounted on said plate structure, a pair of cups having circular ends secured to the underside of said carriage bar with other flanged ends of the cups opening downward for receiving and holding a pair of lens assemblies, and locking means carried by said carriage bar for locking the bar in certain positions on the plate structure for clearing camera operating members at the underside of the camera.

6. In combination, a camera having a plate structure on the underside thereof, a channel-shaped carriage bar slidably mounted on said plate structure, a pair of cups having circular ends secured to the underside of said carriage bar with other flanged ends of the cups opening downward for receiving and holding a pair of lens assemblies, a locking pin carried by said bar, said pin having a stud, said screw having a head for receiving said stud to lock the bar in a certain position on said plate structure, a spring on said stud normally biasing the stud inwardly toward said plate structure and holding the stud tip in said recess, said pin having a head disposed outside the bar for retracting the stud from said recess for moving the carriage bar longitudinally along the plate structure.

7. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and holding a pair of lens assemblies, a mounting screw centrally located in said plate structure for engaging in a threaded hole in the underside of the camera, a locking pin carried by said bar, said pin having a stud with noncircular tip, said screw having a head with noncircular recess for receiving said tip to lock the bar in a certain position on said plate, a spring on said stud normally biasing the stud inwardly toward said plate structure and holding the stud tip in said recess, said pin having a head disposed outside the bar for retracting the stud from said recess for moving the carriage bar longitudinally along the plate structure, said pin being turnable to turn said screw for mounting said plate structure at the underside of the camera and for detaching the plate structure therefrom, said plate structure having another recess spaced from said screw and aligned therewith longitudinally of the plate structure for engaging said stud to lock the bar in another position of the plate structure and to clear a winding key at the underside of the camera.

8. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and supporting a pair of lens assemblies, said plate structure having a longitudinal slot therein, and a locking pin carried by said bar, said pin having a stud spring-biased inwardly toward said plate structure and extending through said slot for engaging in recesses in the underside of the camera, said pin having a head disposed outside of said bar for retracting the stud in said slot as the carriage bar is moved longitudinally along said plate structure to clear operating members at lateral edges of the underside of the camera.

9. A holding device for lenses at the underside of a camera, comprising a plate structure removably attachable to the underside of the camera, a channel-shaped carriage bar slidably mounted on said plate structure, a pair of cups having circular ends secured to the underside of said carriage bar with other flanged ends of the cups opening downward for receiving and supporting a pair of lens assemblies, said plate structure having a longitudinal slot therein, a locking pin carried by said bar, said pin having a stud spring-biased inwardly toward said plate structure and extending through said slot for engaging in recesses in the underside of the camera, said pin having a head disposed outside of said bar for retracting the stud in said slot as the carriage bar is moved longitudinally along said plate structure to clear operating members at lateral edges of the underside of the camera, and means for permanently attaching said plate structure to the underside of the camera.

10. The combination as defined in claim 6, and said pin being turnable to turn said screw for mounting said plate structure at the underside of the camera and for detaching the plate structure therefrom.

References Cited by the Examiner
UNITED STATES PATENTS 2,290,307   7/1942   Wicker _____ 95—86
2,720,145  10/1955   Goodfellow _____ 95—86 X JOHN M. HORAN, Primary Examiner.